(12) United States Patent
Cadieux et al.

(10) Patent No.: US 9,338,939 B1
(45) Date of Patent: May 17, 2016

(54) SEED DISK FOR PLANTING CANOLA WITH A VACUUM METER PLANTER

(71) Applicant: RRV Canola Disk Inc., Letellier (CA)

(72) Inventors: Kerry Paul Bernard Cadieux, Letellier (CA); Jeffrey Steven Calder, Letellier (CA)

(73) Assignee: RRV CANOLA DISK INC., Letellier, Manitoba (CA)

( * ) Notice: Subject to any disclaimer, the term of this patent is extended or adjusted under 35 U.S.C. 154(b) by 0 days.

(21) Appl. No.: 14/608,976

(22) Filed: Jan. 29, 2015

(51) Int. Cl.
*A01C 7/12* (2006.01)
*A01C 7/04* (2006.01)

(52) U.S. Cl.
CPC .............. *A01C 7/127* (2013.01); *A01C 7/044* (2013.01); *A01C 7/046* (2013.01)

(58) Field of Classification Search
CPC ........ A01C 7/046; A01C 7/044; A01C 7/042; G07F 11/10
USPC ............... 111/184, 185; 221/87, 88, 211, 278
See application file for complete search history.

(56) References Cited

U.S. PATENT DOCUMENTS

| 4,688,698 | A | * | 8/1987 | Holland | A01C 7/046 111/34 |
| 6,176,393 | B1 | * | 1/2001 | Luxon | A01C 7/046 111/185 |
| 6,932,236 | B2 | | 8/2005 | Ven Huizen | |
| 7,334,532 | B2 | * | 2/2008 | Sauder | A01C 7/046 111/185 |

* cited by examiner

*Primary Examiner* — John G Weiss
(74) *Attorney, Agent, or Firm* — Kyle R. Satterthwaite; Ryan W. Dupuis; Ade & Company Inc.

(57) ABSTRACT

A unique seed disk for use in a vacuum type agricultural planter is particularly suited for planting of canola seed. Seed apertures extend through the disk in the thickness direction from the vacuum-side face thereof to the opposing seed-side face thereof, and are each circular in cross-sectional shape. Each apertures features a cylindrical end portion opening through the vacuum-side face of the disk body, a first frustoconical portion whose wider end communicates with the cylindrical end portion, an intermediate cylindrical portion communicating with the narrower end of the first frustoconical portion, and a second frustoconical portion having a narrower end that communicates with the intermediate cylindrical portion and an opposing wider end that opens through the seed-side face of the disk body. A preferred embodiment features ninety seed apertures in the disk, and an accompanying twelve prong knockout wheel for dislodging debris individually from the seed apertures.

19 Claims, 4 Drawing Sheets

SEED DISK FOR PLANTING CANOLA WITH A VACUUM METER PLANTER

FIELD OF THE INVENTION

The present invention relates generally to agricultural planters with vacuum seed meters, and more particularly to a unique seed disk that allows that improves the efficiency and effectiveness of such planters when used for canola seed, where conventional seed disks designed for other crops have not been well suited for use with canola seed.

BACKGROUND

Agricultural vacuum planters employ a plurality of row planters, each featuring a seed metering unit which relies on a seed disk rototably mounted within a housing in order to convey seeds individually from a respective seed hopper into a seeding chute that reaches down between a pair of furrowing disks in order to deliver the seed into a furrow opened in the ground by these furrowing disks. Inside the housing of the metering unit, the seed disk divides the housing interior into two sides, a vacuum side to which a vacuum pump is coupled to induce a low pressure state on this side of the disk, and a seed side having a seed chamber into which seed falls from the hopper via a supply chute coupled between the hopper and the seed unit. The housing of the metering unit has two hinged together halves that enclose the respective sides of the housing interior when closed together, while enabling opening of the housing to allow installation, inspection, removal, replacement, etc. of the seed disk. The seed disk has a plurality of apertures passing axially through it near the outer periphery of the disk at equally spaced positions disposed circumferentially around the central rotational axis of the disk. The vacuum source acting on the vacuum side of the disk pulls an individual seed into the open end of each aperture on the seed side of the disk as the aperture moves through the seed chamber under rotation of the seed disk, whereupon continued rotation of the seed disk then conveys the seed to the inlet of the seeding chute, where the seed falls through the seeding chute and into the furrow.

John Deere is a well-known manufacturer of such vacuum metered planters. One example of a seed metering unit and associated seed disk for a John Deere planter is disclosed in U.S. Pat. No. 6,932,236 of Ven Huizen, the entirey of which is incorporated herein by reference. The Huizen patent concerns a particular seed disk design and associated double eliminator and knockout assembly for improving the efficiency of a John Deere planter when planting corn seed.

Most commercially available seed disks have been designed for sunflower, cotton, soybean, sorghum, sugar beets, popcorn, sweet corn, and corn seed. Applicant previously planted canola seed used commercially available sugar beet seed disks on a John Deere planter, but found that the resulting performance was far from optimal. One notable problem was the lack of 'singulation', i.e. the conveyance of only a singular seed by each disk aperture. The tear-drop shaped apertures in the sugar beet disks had a tendency to pick up more than one canola seed in a single aperture.

Accordingly, there remained a need for a seed disk particularly suitable for use with canola seed, based on which Applicant undertook the development of the present invention to solve the shortcomings of the prior art in relation to planting of canola seed using a vacuum planter.

SUMMARY OF THE INVENTION

According to one aspect of the invention there is provided a seed disk for use in a vacuum seed meter of an agricultural planter to plant canola seed, the seed disk comprising:

a disk body for rotatable support within a housing of the vacuum seed meter for rotation of said disk body about a central axis thereof, the disk body having a vacuum-side face and an opposing seed-side face that are disposed in respective planes lying normal to the central axis and spaced apart from one another along a thickness direction of the disk measured along the central axis thereof;

a plurality of apertures extending through the disk in the thickness direction from the vacuum-side face thereof to the opposing seed-side face thereof, the apertures being circumferentially arranged around the central axis of the disk at equally spaced apart positions from one another near an outer periphery thereof;

wherein each aperture is of circular cross-sectional shape in cross-sectional planes lying normal to the central axis, and comprises a cylindrical end portion opening through the vacuum-side face of the disk body, a first frustoconical portion communicating with the cylindrical end portion through a wider end of said first frustoconical portion, and a second frustoconical portion communicating with the first frustoconical portion through a narrower end of said second frustoconical portion and opening through the seed-side face of the disk body at a wider end of said second frustoconical portion.

Preferably each aperture further comprises an intermediate cylindrical portion disposed between and communicating with the first and second frustoconical portions communicating at the narrower ends thereof such that the frustoconical portions communicate with one another through said intermediate cylindrical portion.

Preferably each aperture consists only of said cylindrical end portion, said first frustoconical portion, said intermediate cylindrical portion, and said second frustoconical portion.

Preferably the first frustoconical portion and said second frustoconical portion are tapered at a same angle as one another.

The first frustoconical portion and the second frustoconical portion of each aperture may be equal to one another in axial length, as measured along the central axis in the thickness direction of the disk.

Preferably the intermediate cylindrical portion of each aperture is smaller in axial length than the cylindrical end portion thereof.

Preferably the intermediate cylindrical portion of each aperture is smaller in axial length than the cylindrical end portion, the first frustoconical portion and the second frustoconical portion.

Preferably the plurality of apertures comprises between 70 and 90 apertures, inclusive.

Preferably the plurality of apertures consists of ninety-apertures.

Preferably a taper angle of the first frustoconical portion is between 84.18 and 89.18 degrees.

Preferably a taper angle of the second frustoconical portion is between 84.18 and 89.18 degrees.

Preferably a diameter of the cylindrical end portion is between 0.15 and 0.25-inches, inclusive. In one particularly preferable embodiment, the diameter of the cylindrical end portion of each aperture is 0.15-inches.

Preferably at least one of the frustoconical portions of each aperture is 0.08-inches in axial length, as measured along the central axis in the thickness direction of the disk body.

In one embodiment, the disk body is 0.21 inches thick.

In one embodiment, the cylindrical end portion of each aperture is 0.05-inches deep, as measured along the central axis in the thickness direction of the disk body.

In one embodiment, the intermediate cylindrical portion of each aperture is 0.01-inches deep, as measured along the central axis in the thickness direction of the disk body In one embodiment, the disk body is 0.21 inches thick, the cylindrical end portion is 0.05-inches deep and 0.15-0.19 inches in diameter, the intermediate cylindrical portion is 0.01 inches deep, and the first and second frustoconical portions are each 0.08-inches deep and each have a taper angle of between 84.18 and 89.18 degrees.

The disk is preferably provided or used in combination with a knock-out wheel mountable in the seed meter in a rotatable condition biased against the vacuum side of the disk, the knock-out wheel having a plurality of prongs projecting radially outward therefrom at positions equally spaced around the periphery of the knock-out so that as the disk body rotates, so does the knock-out wheel, whose prongs engage in the apertures to knock debris out from the second frustoconical portion at the seed-side of the disk body.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
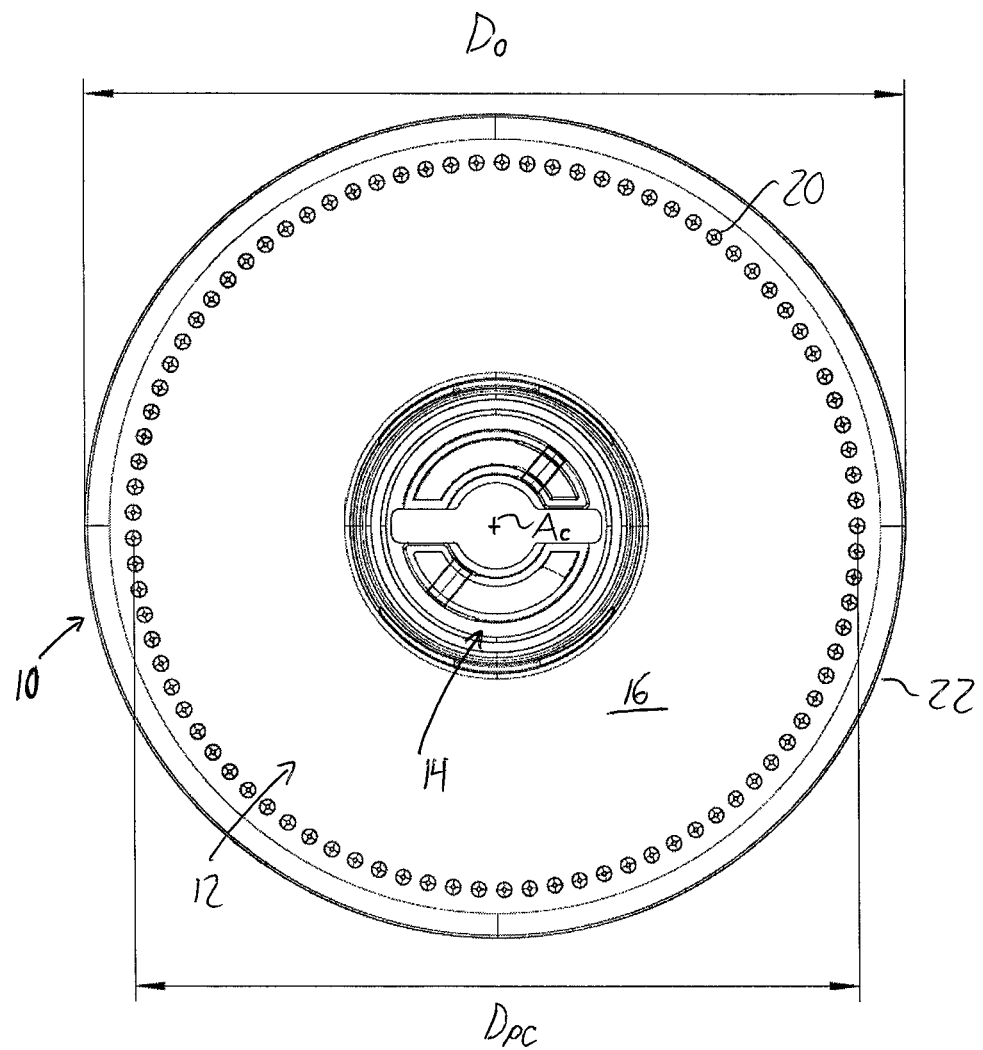
FIG. 1 is a side view of a canola seed disk according to one embodiment of the present invention.
Figure 2:
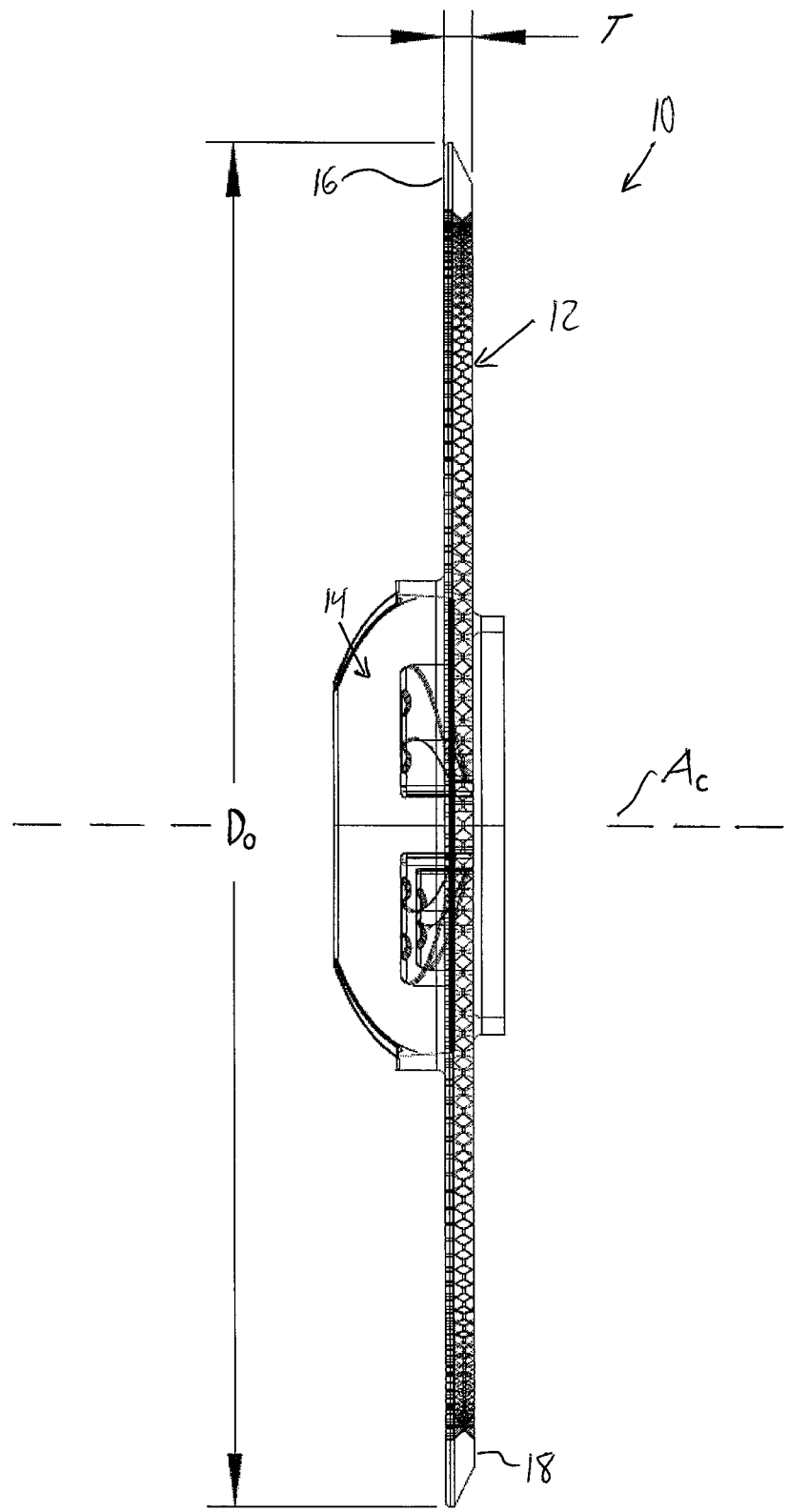
FIG. 2 is an edge-on view of the canola seed disk.

FIG. 1 shows a canola seed disk 10 according to one embodiment of the present invention. In a conventional manner, the disk 10 features a circular plate-like body 12 defining the overall disk shape of the article, and a mounting hub 14 affixed to the plate-like body 12 at a central location thereon for use in mounting the disk inside the interior space of a vacuum seed meter in a conventional manner for rotation about a central axis $A_C$ shared by the plate-like body and the mounting hub 14 thereon. The plate-like body 12 has two major faces that reside in respective planes lying normal to the central axis $A_C$ at spaced apart positions therealong. When the disk 10 is mounted in the housing of the vacuum seed meter, one of the two major faces of the plate-like body 1 faces the vacuum side of the meter's interior space, and therefore is referred to herein as the vacuum-side face 16 of the disk 10. The other major face of the plate-like body 12 of the disk 10 faces the seed-side of the meter housing's interior space, and therefore is referred to herein as the seed-side face 18 of the disk 10. A perpendicular distance between the two faces 16, 18 defines a thickness dimension T of the disk that is measured parallel to the axial direction of the disk, i.e. along the central axis $A_C$ thereof. The thickness dimension T of the illustrated embodiment is 0.21-inches.

A plurality of seed apertures 20 extend axially through the plate-like body 12 of the disk to span the full thickness dimension T thereof from the vacuum-side face 16 to the opposing seed-side face 18 thereof. The number of apertures is preferably between seventy and ninety apertures, and specifically ninety apertures in the illustrated embodiment. The apertures 20 are arranged circumferentially around the central axis $A_C$ of the disk at equally spaced positions therearound at the same notable distance outward therefrom, thus residing near the outer peripheral edge 22 of the plate-shaped body 12. In a conventional manner, when the disk 10 is driven for rotation inside the housing of the vacuum seed meter, each aperture thus revolves around the central rotational axis $A_C$. The term 'pitch circle' is used herein to denote an imaginary circle that is centered on the central axis A and on which the circumferentially arranged seed apertures reside so that pitch circle interests the axis of each seed apertures. The pitch circle diameter $D_{PC}$ of the illustrated embodiment is 8.86-inches, whereby the radial distance from the central axis A to the center of each seed aperture 20 is 4.43-inches. The outer diameter $D_O$ of the disk, as measured between diametrically opposite points on the outer peripheral edge 22 of the plate-shaped body 12, is 10.03-inches in the illustrated embodiment. The particular pitch circle diameter $D_{PC}$ and aperture number of the illustrated embodiment results in a center-to-center spacing of 0.31-inches between adjacent seed apertures on the pitch-circles circumferential path around the central axis $A_C$.

Figure 3:
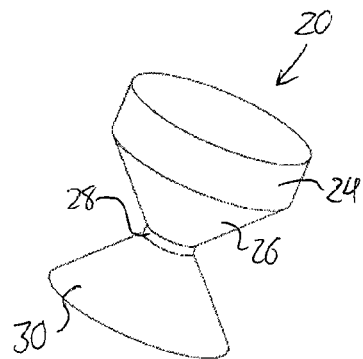
FIG. 3 is a schematic perspective view illustrating a three-dimensional shape of the seed apertures in the canola seed disk.
Figure 4:
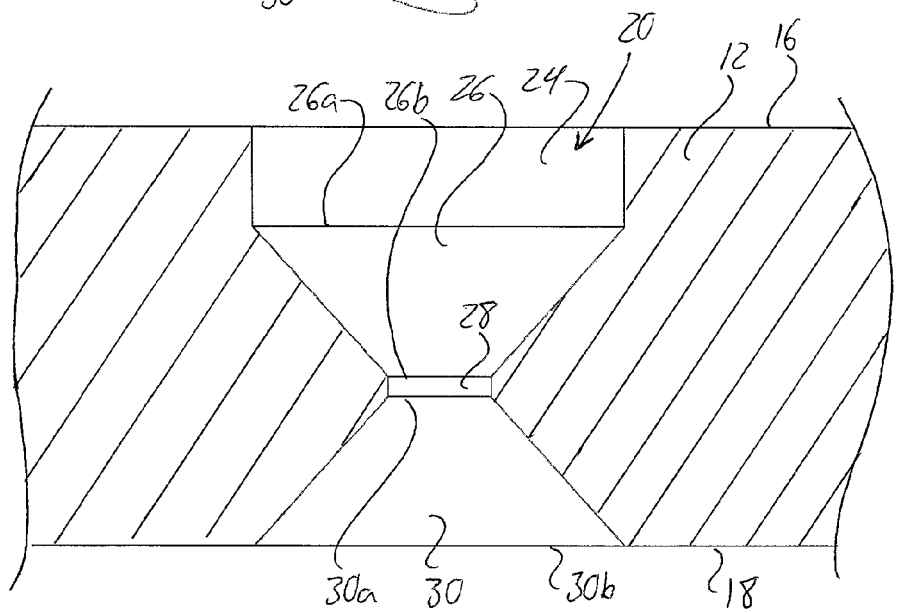
FIG. 4 is a partial cross-sectional view of the canola seed disk illustrating one of the seed apertures therein.
Figure 5:
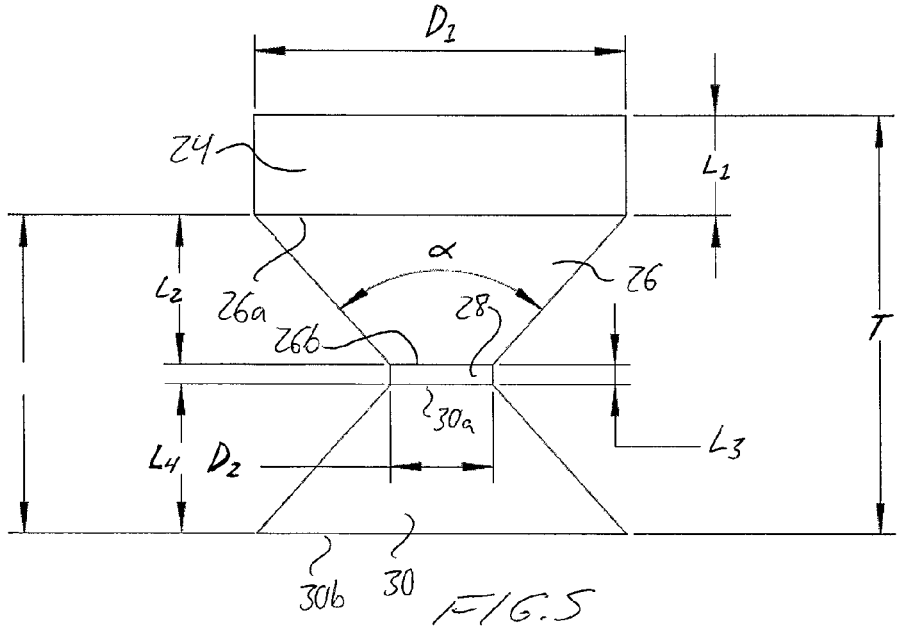
FIG. 5 is a dimensioned schematic drawing illustrating various dimensions of the seed aperture shape shown in FIGS. 3 and 4.

Turning to FIGS. 3 and 4, attention is now turned to the unique aperture shape of the present invention, which has been designed and tested for optimal performance with canola seed. The aperture has a circular cross-sectional shape in all planes of the disk that lie normal to the central axis $A_C$. However, the diameter of the circular cross-sectional shape is not uniform throughout. Instead, the aperture is divided into four distinct portions of varying three-dimensional shape that lie end-to-end in the axial or thickness direction of the disk.

A cylindrical end portion 24 of each aperture opens into the plate-shaped body 12 of the disk from the vacuum-side face 16 thereof, and has an axial length $L_1$ measured in the axial thickness direction defined by the central axis A. In the illustrated embodiment, this axial length $L_1$ is 0.05-inches. A diameter $D_1$ of the cylindrical end portion 24 is preferably between 0.15 and 0.25-inches, and more particularly 0.19-inches in the illustrated embodiment.

A first frustoconical portion 26 of each aperture concentrically connects with and opens into the cylindrical end portion 24 at a wider end 26a of the first frustoconical portion, which shares the same diameter $D_1$ as the cylindrical end portion 24. The angle of taper a of the first frustoconical portion 26, as measured between diametrically opposing points on the sloped circumferential wall thereof, is preferably between 84.18 and 89.18 degrees, and more particularly 89.18 degrees in the illustrated embodiment. The axial length $L_2$ of the first frustoconical portion is 0.08-inches in the illustrated embodiment.

An intermediate cylindrical portion 28 having the same diameter $D_2$ as the narrower end 26b end of the first frustoconical portion 26 connects concentrically therewith, and opens thereinto. The axial length $L_3$ of the intermediate cylindrical portion is 0.01-inches in the illustrated embodiment.

A second frustoconical portion 30 of each aperture concentrically connects with and opens into the intermediate cylindrical portion 24 at the narrower end 30a of the second frustoconical portion, which shares the same diameter $D_2$ as the intermediate cylindrical portion 28. The wider end 30b of the second frustoconical portion opens through the seed-side face 18 of the disk 10, thereby completing the aperture's passage through the entire thickness of the disk 10. The second frustoconical portion 26 preferably has the same taper angle α as the first frustoconical portion, but tapers in the opposite direction. That is, the first frustoconical portion widens toward the vacuum-side face 16 of the disk 10, while the second frustoconical portion widens toward the seed-side face 18 of the disk 10. In the illustrated embodiment, the second frustoconical portion has the same axial length $L_2$ as the first frustoconical portion.

The above-described dimensions of the illustrated embodiment, together with the illustrated mounting hub of a known configuration, cooperate to define a canola seed disk compatible with vacuum meter John Deere planters, whereby the disk can be mounted within the meter housing in the same manner as described and illustrated in the aforementioned Ven Huizen patent. As the mounting of the disk and the resulting rotational operation thereof are conventional in nature and well-known to those of skill in the art, further details concerning same are omitted in the interest of brevity.

Figure 6:
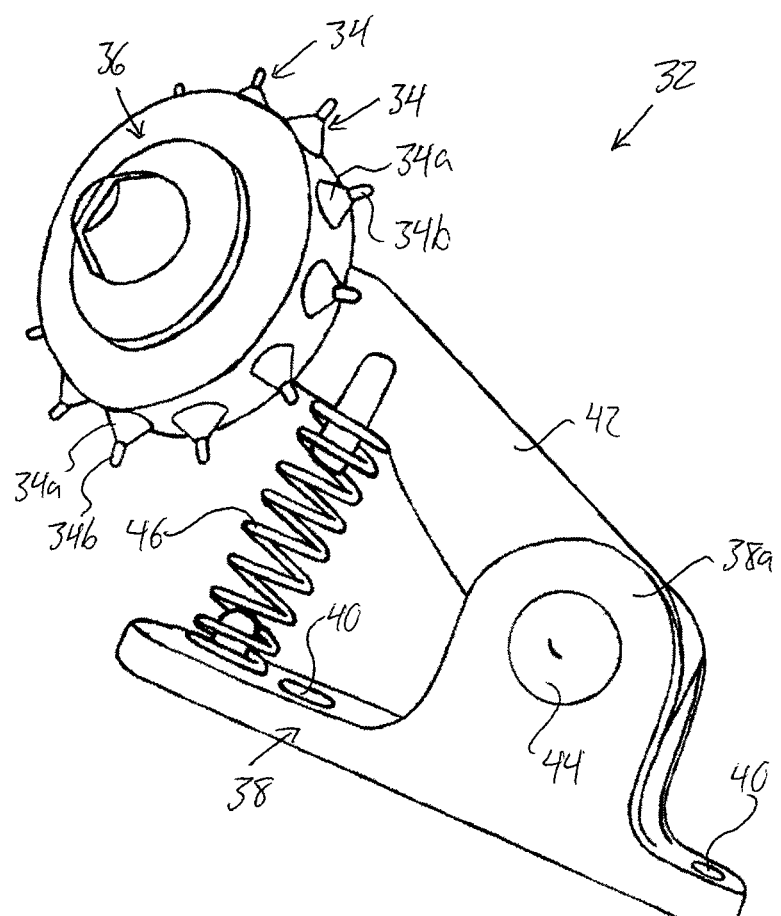
FIG. 6 is a perspective view of a knockout assembly for use with the canola seed disk to knock debris out from a respective aperture of the disk as the aperture passes the knockout assembly during rotation of the disk.

FIG. 6 illustrates a knockout assembly 32 similar those commercially available from John Deere, as described and illustrated in the aforementioned Ven Huizen patent. However, the knockout assembly differs from that of the Ven Huizen reference in the number and shape of radial prongs 34 on the wheel 36. The knockout assembly 32 has a generally planar base member 38 with holes 40 therein through which threaded fasteners, not shown, can be engaged into corresponding threaded bores in the meter housing to support the knock-out assembly thereon in a position residing within the interior of the housing on the vacuum side of the disk. The assembly 32 further includes an arm 42 pivotally attached by a pin 44 to integral lugs 38a that project to one side of the base member 38. A compression spring 46 extends between the base and the arm to urge the arm 42 away from the base member 38. The wheel 38 is rotatably supported at the distal end of the arm 124, and features a plurality of equally spaced, radially extending prongs 34, of which there are twelve in the illustrated embodiment. As is well-known in the art, the mounted position of the base member of the knockout assembly within the meter housing cooperates with the spring force of the compression spring to urge the pronged wheel against the vacuum side face 16 of the disk at the pitch circle on which the apertures are disposed.

The prongs 34 of the knockout assembly 32 are angularly spaced on the wheel 36 such that one prong 34 will extend into each of the apertures 20 of the seed disk 10 as the disk 10 rotates around its central axis inside the meter housing. That is, rotation of the disk drives rotation of the knockout wheel 36 in a manner causing the prongs 34 to penetrate into the apertures of the seed disk one at time. This action dislodges any debris that may collect in each aperture on the seed side of the disc during use, thereby preventing or relieving a clogged state of any aperture will detriment the disk's ability to pick up seed from the seed chamber using the vacuum pressure exerted from the vacuum side of the disk.

The twelve-pronged knockout wheel 36 of the illustrated embodiment is particularly suited for the ninety-hole seed disk 10 of the illustrated embodiment. However, the number of prongs required to achieve circumferential prong spacing that is compatible with a given seed disk may vary not only with the number of apertures in the seed disk, but also with the diameter of the knock-out wheel.

The knockout prongs 34 of the illustrated embodiment have the same shape as a commercially available John Deere knockout wheel that is available for use with John Deere's sugar beet discs. Each prong 34 includes a base 34a of frustoconical shape that narrows in an outwardly radial direction from the knockout wheel, and a respective tip 34b that is cylindrically shaped over the majority of its radially outward extension from the frustoconical base and rounded off at the distal end of the tip 34b. During use, the frustoconical base 34a of the prong reaches through the cylindrical end portion 24 of the disk's seed aperture 20 and into the first frustoconical portion 26 thereof, from where the tip 34b reaches onward through the narrower intermediate cylindrical portion 30 to knock the debris out of the aperture through the second frustoconical portion 32 thereof on the seed side of the disk.

The above described seed disk aperture configuration, with a cylindrically configured vacuum end and two oppositely-tapered frustoconical portions on opposing sides of a shorter intermediate cylindrical portion has been found notably effective for planting of canola seeds, and overcomes or alleviates the singulation problem that was found to occur when using commercially available sugar beet disks for canola seed. Accurate reliable performance is further enhanced with use of the optional knockout wheel described herein.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. A seed disk for use in a vacuum seed meter of an agricultural planter to plant canola seed, the seed disk comprising:
    a disk body for rotatable support within a housing of the vacuum seed meter for rotation of said disk body about a central axis thereof, the disk body having a vacuum-side face and an opposing seed-side face that are disposed in respective planes lying normal to the central axis and spaced apart from one another along a thickness direction of the disk measured along the central axis thereof;
    a plurality of apertures extending through the disk in the thickness direction from the vacuum-side face thereof to the opposing seed-side face thereof, the apertures being circumferentially arranged around the central axis of the disk at equally spaced apart positions from one another near an outer periphery thereof;
    wherein each aperture is of circular cross-sectional shape in cross-sectional planes lying normal to the central axis, and comprises a cylindrical end portion opening through the vacuum-side face of the disk body, a first frustoconical portion communicating with the cylindrical end portion through a wider end of said first frustoconical portion, and a second frustoconical portion communicating with the first frustoconical portion through a narrower end of said second frustoconical portion and opening through the seed-side face of the disk body at a wider end of said second frustoconical portion.

2. The seed disk of claim 1 each aperture further comprises an intermediate cylindrical portion disposed between and communicating with the first and second frustoconical portions at the narrower ends thereof such that the frustoconical portions communicate with one another through said intermediate cylindrical portion.

3. The seed disk of claim 2 wherein each aperture consists only of said cylindrical end portion, said first frustoconical portion, said intermediate cylindrical portion, and said second frustoconical portion.

4. The seed disk of claim 2 wherein the intermediate cylindrical portion of each aperture is smaller in axial length than the cylindrical end portion thereof.

5. The seed disk of claim 2 wherein the intermediate cylindrical portion of each aperture is smaller in axial length than each of the cylindrical end portion, the first frustoconical portion and the second frustoconical portion.

6. The seed disk of claim 2 wherein the intermediate cylindrical portion of each aperture is 0.01-inches deep, as measured along the central axis in the thickness direction of the disk body.

7. The seed disk of claim 1 wherein the first frustoconical portion and said second frustoconical portion are tapered at a same angle as one another.

8. The seed disk of claim 1 wherein the first frustoconical portion and the second frustoconical portion of each aperture are equal to one another in axial length, as measured along the central axis in the thickness direction of the disk.

9. The seed disk of claim 1 wherein the plurality of apertures comprises between 70 and 90 apertures, inclusive.

10. The seed disk of claim 1 wherein the plurality of apertures consists of ninety-apertures.

11. The seed disk of claim 1 wherein a taper angle of the first frustoconical portion is between 84.18 and 89.18 degrees.

12. The seed disk of claim 1 wherein a taper angle of the second frustoconical portion is between 84.18 and 89.18 degrees.

13. The seed disk of claim 1 wherein a diameter of the cylindrical end portion is between 0.15 and 0.25-inches, inclusive.

14. The seed disk of claim 13 wherein the diameter of the cylindrical end portion of each aperture is 0.15-inches.

15. The seed disk of claim 1 wherein at least one of the frustoconical portions of each aperture is 0.08-inches in axial length, as measured along the central axis in the thickness direction of the disk body.

16. The seed disk of claim 1 wherein the disk body is 0.21 inches thick.

17. The seed disk of claim 1 wherein the cylindrical end portion of each aperture is 0.05-inches deep, as measured along the central axis in the thickness direction of the disk body.

18. The seed disk of claim 1 wherein the disk body is 0.21 inches thick, the cylindrical end portion is 0.05-inches deep and 0.15-0.25 inches in diameter, and the first and second frustoconical portions are each 0.08-inches deep and each have a taper angle of between 84.18 and 89.18 degrees.

19. The seed disk of claim 2 wherein the disk body is 0.21 inches thick, the cylindrical end portion is 0.05-inches deep and 0.15-0.25 inches in diameter, the intermediate cylindrical portion is 0.01 inches deep, and the first and second frustoconical portions are each 0.08-inches deep and each have a taper angle of between 84.18 and 89.18 degrees.

* * * * *